United States Patent

Miura et al.

[11] Patent Number: 5,292,862
[45] Date of Patent: Mar. 8, 1994

[54] METHOD FOR THE PYROLYSIS OF POLYMERS

[75] Inventors: Eigo Miura; Takashi Yamanaka; Ryoji Ohori; Akio Ohdaira; Kenichi Nishiwaki; Yoshikuni Itoh; Yoshinori Morita; Hajime Inagaki, all of Kuga, Japan

[73] Assignee: Mitsui Petrochemical Industries, Ltd., Tokyo, Japan

[21] Appl. No.: 778,051

[22] PCT Filed: Apr. 10, 1991

[86] PCT No.: PCT/JP91/00471
 § 371 Date: Jan. 22, 1992
 § 102(e) Date: Jan. 22, 1992

[87] PCT Pub. No.: WO91/15521
 PCT Pub. Date: Oct. 17, 1991

[30] Foreign Application Priority Data

Apr. 10, 1990 [JP] Japan ................................ 2-94498
May 14, 1990 [JP] Japan ............................... 2-123865
Jun. 28, 1990 [JP] Japan ............................... 2-170438

[51] Int. Cl.⁵ ........................................... C08F 6/26
[52] U.S. Cl. ................................. 528/481; 528/486; 528/488
[58] Field of Search ..................... 528/481, 486, 488

[56] References Cited

U.S. PATENT DOCUMENTS

| 2,372,001 | 3/1945  | Joyce ............................. 528/481 |
| 2,835,659 | 5/1958  | Guillet ........................... 528/481 |
| 3,083,193 | 3/1963  | Kolner ........................... 528/481 |
| 3,087,922 | 5/1958  | Whittington .................. 528/481 |
| 3,341,621 | 9/1967  | Hagemeyer et al. ......... 528/481 |
| 3,519,609 | 7/1970  | McConnell et al. .......... 526/351 |
| 4,710,563 | 12/1987 | Oetting .......................... 528/481 |

FOREIGN PATENT DOCUMENTS

| 859951  | 10/1952 | Fed. Rep. of Germany . |
| 1940686 | 2/1971  | Fed. Rep. of Germany . |
| 3146194 | 5/1983  | Fed. Rep. of Germany . |
| 1011950 | 12/1965 | United Kingdom . |
| 1310260 | 3/1973  | United Kingdom . |

*Primary Examiner*—Joseph L. Schofer
*Assistant Examiner*—Tom Weber
*Attorney, Agent, or Firm*—Sherman and Shalloway

[57] ABSTRACT

The method includes the steps of feeding a polymer to an extruder where the polymer is melted, metering the molten polymer from the extruder to a tubular pyrolysis reactor through metering means connected to the extruder, and pyrolytically decomposing the polymer in the tubular pyrolysis reactor in the presence of a higher fatty acid, and/or a hydrochloric acid acceptor.

9 Claims, 1 Drawing Sheet

METHOD FOR THE PYROLYSIS OF POLYMERS

FIELD OF THE INVENTION

This invention relates to a method for pyrolytically decomposing a polymer to continuously produce a low molecular weight polymer of quality in a simplified apparatus through simple steps, and more particularly, to a method for producing a pyrolytic wax by pyrolytically decomposing an olefin polymer and effectively removing volatile components resulting from the pyrolytic reaction from the reaction mixture using a simplified apparatus whereby a pyrolytic wax of quality having satisfactory hue and a minimal content of contaminants is continuously produced in a stable manner for a long period.

BACKGROUND OF THE INVENTION

Heretofore, low molecular weight polymers, for example, low molecular weight polyolefins such as polyethylene and polypropylene have been widely used as waxes in a variety of applications, for example, such as pigment dispersants, rubber processing aids, resin processing aids, additives to ink and coating compositions, fiber treating agents, and electrostatographic toners. In the recent years, the demand for such low molecular weight polymers in these applications is increasing and more strict requirements are imposed on their quality.

Known methods for producing low molecular weight polyolefins include telomerization of olefins, thermal degradation of high molecular weight polymers, and separation and purification of low molecular weight polymers by-produced during the preparation of high molecular weight polymers.

However, the previously proposed processes based on thermal degradation suffer from several problems in that the size of reactor is increased when a tank type reactor is used for batchwise mass production, and that control of reaction conditions such as temperature is difficult when a tubular reactor is used.

In the pyrolytic processes, volatile components including low molecular weight hydrocarbons are produced during pyrolysis of polyolefins, and if such volatile components, even in minor amounts, are left in the final product of pyrolytic wax, the pyrolytic wax becomes deteriorated in quality with respect to residual volatile content, smell, flash point, molecular weight distribution and the like. Further, the low molecular weight hydrocarbons can be oxidized with air entrained with the polyolefin feed and air incidentally admitted on the way of the process to thereby produce oxygenated hydrocarbons which will adversely affect the hue of the pyrolytic wax product, and the degree of separation of such hydrocarbons varies among separating techniques. It is thus necessary to effectively remove the volatile components in the production process.

Moreover, since the thermal degradation processes generally use severe reaction conditions, it is likely that low molecular weight fractions of the resulting polyolefin have poor hue due to thermal history and thermally deteriorated contaminants are formed in the reactor, and consequently, a continuous mode of production is difficult. To overcome this problem, a method of carrying out pyrolysis in the presence of steam-containing inert gas was proposed (Japanese Patent Publication No. 9368/1968). This method, however, imposes substantial limitations on the protection of apparatus against corrosion and the selection of apparatus material and adds complexity to reaction operation, leaving practical problems.

SUMMARY OF THE INVENTION

A first object of the present invention is to provide a method capable of pyrolytically decomposing a polymer to continuously produce low molecular weight polymers of quality in a simplified apparatus through simple steps.

A second object of the present invention is to provide a method capable of continuously producing a pyrolytic wax of quality having satisfactory hue and a minimal content of contaminants, due to controlled formation of thermally deteriorated contaminants in the reactor, in a stable manner for a long period.

A third object of the present invention is to provide a method capable of producing a pyrolytic wax of quality by pyrolytically decomposing a polymer, especially an olefin polymer and immediately and effectively removing the resulting volatile components from the reaction mixture.

To achieve the first object, the present invention provides a method for the pyrolysis of a polymer comprising the steps of feeding a polymer to an extruder where the polymer is melted, metering the molten polymer from the extruder to a tubular pyrolysis reactor through metering means connected to the extruder, and pyrolytically decomposing the polymer in the tubular pyrolysis reactor to produce low molecular weight polymers.

To achieve the second object, the present invention provides a method for producing a pyrolytic wax comprising the step of pyrolytically decomposing an olefin polymer in the presence of a higher fatty acid and/or a hydrochloric acid acceptor.

To achieve the third object, the present invention provides a method for producing a pyrolytic wax comprising the steps of introducing a reaction mixture resulting from pyrolytic reaction of an olefin polymer in a pyrolysis reactor into an evaporator connected to the pyrolysis reactor at a high temperature, causing the reaction mixture to evaporate in the evaporator while blowing an inert gas into the evaporator, withdrawing volatile components separated from the reaction mixture from the evaporator, and withdrawing the reaction mixture from the evaporator.

Preferably, an insert is disposed in the interior of the evaporator for promoting separation of volatile components from the reaction mixture in the evaporator interior.

BEST MODE FOR CARRYING OUT THE INVENTION

Now the method for the pyrolysis of polymers according to the present invention is described in detail.

The polymer pyrolysis method of the invention is not limited to a certain type of polymer, but applicable to all types of polymers as long as they are pyrolytically decomposable. Examples of the polymer include homopolymers of α-olefins such as ethylene, propylene, 1-butene, isobutene, 1-pentene, 2-methyl-1-butene, 3- methyl-1-butene, 1-hexene, 3-methyl-1-pentene, 4-methyl-1-pentene, 1-heptene, 1-octene, 1-decene, 1-dodecene, 1-tetradecene, 1-hexadecene, 1-octadecene, 1-eicosene, etc.; copolymers of these α-olefins with monomers copolymerizable therewith; and polymers of styrene, (meth)acrylic acid, (meth)acrylates, vinyl acetate, etc. and all thermoplastic polymers excluding vinyl halide monomers such as polyvinyl chloride and polyvinylidene chloride, and any of these polymers can be pyrolytically decomposed into corresponding low molecular weight polymers.

Examples of the monomers copolymerizable with α-olefins include acrylic acid, methacrylic acid, acrylates, methacrylates, vinyl acetate, polybasic unsaturated carboxylic acids such as maleic acid and anhydrides and esters thereof, etc. The method of the invention is particularly useful in the pyrolysis of olefin polymers, for example, homopolymers of α-olefins such as polyethylene, polypropylene, poly-1-butene, and poly-4-methyl-1-pentene and polymers based on α-olefins into lower molecular weight ones, thereby producing a pyrolytic wax consisting of low molecular weight polymers. The invention is illustrated below with respect to the preparation of pyrolytic wax.

Figure 1:
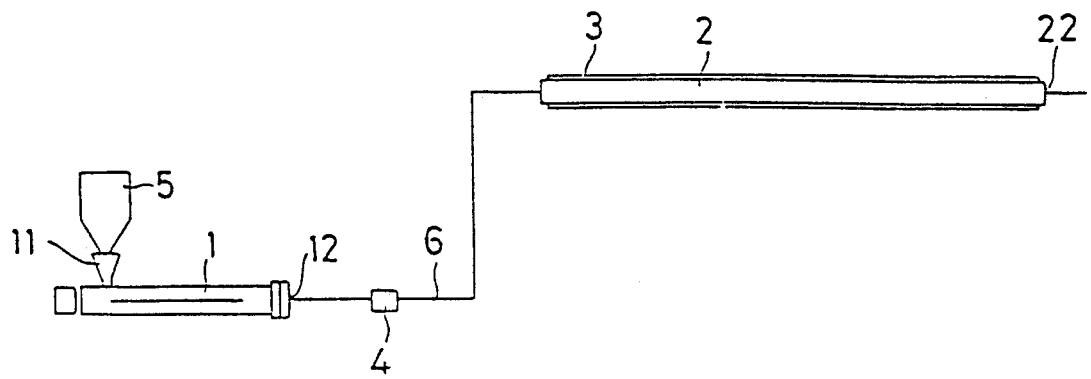
FIG. 1 is a view illustrating a first embodiment of the present invention.

Referring to FIG. 1 showing the first embodiment of the invention, there are illustrated an extruder 1, a tubular pyrolysis reactor 2, heater means 3 for heating the tubular pyrolysis reactor 2, and metering means 4.

In the apparatus, a polymer feed is supplied to the extruder 1 from a hopper 5 connected to a feed inlet 11 of the extruder 1, melted and milled in the extruder 1 at a predetermined temperature, and extruded out of an extruder outlet 12.

The extruder is not particularly limited to a certain type, but all types of extruders can be used, for example single or twin screw type, as long as it can melt and extrude a polymer feed.

For melting the polymer feed in the extruder, the extruder is heated to a temperature which may be properly selected in accordance with a particular type of polymer feed to be melted.

For example, temperatures of about 200° to 350° C., preferably about 270° to 330° C. are used when olefin polymers such as polyethylene and polypropylene are used as the polymer feed for preparing pyrolytic wax consisting of lower molecular weight olefin polymers.

The rate of extrusion of the polymer through the extruder may be properly selected in accordance with the type, form (pellet, powder or the like), quantity, and melting temperature of the polymer feed used. The diameter and length of the extruder screw may be similarly selected. When olefin polymers such as polyethylene and polypropylene are used as the polymer feed for preparing pyrolytic wax consisting of lower molecular weight olefin polymers, for example, a single screw extruder with a screw having a length to diameter ratio (L/D) of from 15 to 40 is operated at a heating temperature of 200° to 350° C. and at a feed rate of about 10 kg/hr for D = 40 mm.

On delivery of a polymer feed to the extruder, it is preferred to use an inert gas atmosphere as the atmosphere extending from the feed inlet 11 through the extruder to the tubular pyrolysis reactor to be described later in detail, because such an atmosphere is effective for preventing oxidation of the polymer feed, oxidation and coloring of the resulting low molecular weight polymers, and formation of carbonaceous contaminants. An inert gas atmosphere may be established, for example, by passing an inert gas such as nitrogen through the feed inlet 11 from the hopper 5.

After the polymer feed is melted in the extruder 1 and discharged from the extruder outlet 12 in this way, the molten polymer feed is delivered to the tubular pyrolysis reactor 2 through a polymer flowpath 6.

In the practice of the present invention, midway the flowpath 6 through which the molten polymer is delivered from the extruder 1 to the tubular pyrolysis reactor 2, the metering means 4 is preferably disposed for quantitatively controlling the delivery of the molten polymer from the extruder 1 to the tubular pyrolysis reactor 2 because the controlled delivery ensures uniform progress of pyrolytic reaction, succeeding in obtaining homogeneous low molecular weight polymers with a narrow molecular weight distribution and therefore, in higher yields.

The metering means 4 may be a gear pump or screw pump, for example, and any desired one may be selected in accordance with the feed rate of molten polymer to be pumped, viscosity of molten polymer, required precision of feed rate, operating temperature and pressure, and the like. Gear pumps are preferred especially because of their ability to pump even high viscosity molten polymers, precise feed rate, and pressure increase capacity.

Then in the tubular pyrolysis reactor 2, the molten polymer feed is heated by the heater means 3 around the reactor whereby it is pyrolytically decomposed.

The tubular pyrolysis reactor, which is effective for efficiently heating the reaction mixture passing therethrough for pyrolytically decomposing the molten polymer, may be of any desired structure including the single tube type, double tube type having an inner tube for passage of the reaction mixture and an outer tube for passage of heating medium, and multi-tube type having a plurality of reaction tubes for passage of the reaction mixture. Preferably the tubular pyrolysis reactor is longitudinally inclined such that its outlet 22 is at a higher level because gas components resulting from pyrolytic reaction of the polymer can be smoothly discharged from within the pyrolytic reactor, the pyrolytic reactor can be reduced in volume, and the generation of carbonaceous contaminants can be suppressed.

It is preferred to incline the tubular pyrolysis reactor at an inclination angle of about 2 to about 10 degrees since the apparatus can assume a normal arrangement.

If the tubular pyrolysis reactor is too long so that it is disposed in a folded arrangement rather than a linear arrangement, it is preferred for the above-mentioned reason to arrange the pyrolysis reactor so as to uniformly elevate from the inlet to the outlet.

Further preferably, a so-called static mixer, for example, is disposed in the interior of the tubular pyrolysis reactor in order to properly control the flow, agitation, and mixing of the reaction mixture for achieving effective pyrolysis of the polymer feed with concomitant advantages including reduction of the necessary reaction volume of the reactor, increased yields of the resulting low molecular weight polymers, and minimized generation of carbonaceous contaminants. The static mixer is commercially available as the KENICS type from Kenics Co., USA, the SULZER type from Sulzer A.G., Germany, SQUARE mixer from Sakura Seisakusho K.K, Japan, HI-MIXER from Toray K.K., Japan, and T.K.-ROSS LPD mixer from Dow Chemical Co., USA.

The tubular pyrolysis reactor is equipped with heater means which is not particularly limited and may be of any desired heating type including those based on an electric heater, low frequency induction heating, and molten salt heating medium. In particular, heating by an electric heater is easy to precisely control the longitudinal temperature distribution over the tubular pyrolysis reactor, thus resulting in low molecular weight polymers of higher quality. The heating temperature of the tubular pyrolysis reactor may be properly selected in accordance with the polymer feed to be pyrolytically decomposed. For example, a temperature of about 350° to 450° C., preferably about 360° to 430° C. is selected when polyethylene is used as the polymer feed and a temperature is selected in the same range when polypropylene is used.

Further, the residence time of the reaction mixture in the tubular pyrolysis reactor, that is, pyrolytic time of the polymer, the pressure, and the inner diameter of the tubular pyrolysis reactor are generally about 10 minutes to 5 hours, preferably from about 30 minutes to 3 hours, more preferably from about 30 to 100 minutes, about 5 Torr to 50 kg/cm²G, more preferably from about 500 Torr to 1.8 kg/cm²G, and from about ½ to 10 inches, preferably about 4 to 8 inches for single and double tube type pyrolysis reactors and about ¾ to 1½ inches for multi-tube type pyrolysis reactors, respectively.

The reaction mixture containing low molecular weight polymers resulting from pyrolysis is taken out of the tubular pyrolysis reactor 2 through the outlet 22 and further processed in subsequent steps.

Also preferably, pyrolysis of polymers, especially pyrolysis of olefin polymers into lower molecular weight pyrolytic waxes is carried out in the presence of a higher fatty acid and/or a hydrochloric acid acceptor.

Examples of the higher fatty acid used herein include fatty acids having 10 or more carbon atoms such as capric acid, lauric acid, myristic acid, palmitic acid, stearic acid, oleic acid, 12-hydroxystearic acid, ricinoleic acid, arachidinic acid, behenic acid, and montanic acid.

Examples of the hydrochloric acid acceptor include metal salts of higher fatty acids, epoxidized higher fatty acid esters, hydrotalcite, and calcium oxide.

Exemplary of the metal salts of higher fatty acids are metal salts of the above-mentioned higher fatty acids, with exemplary metals being lithium, sodium, potassium, magnesium, calcium, strontium, barium, zinc, cadmium, aluminum, tin, and lead.

Examples of the epoxidized higher fatty acid ester include epoxidized octyl stearate, etc.

In the method of the invention, the higher fatty acids and hydrochloric acid acceptors may be used alone or in admixture of two or more.

Preferred inter alia are stearic acid, palmitic acid, and 12-hydroxystearic acid among the higher fatty acids and calcium stearate, aluminum stearate, and magnesium stearate among the hydrochloric acid acceptors.

In the method of the invention, the higher fatty acid and/or hydrochloric acid acceptor is generally used in an amount of about 0.001 to 1 part by weight, preferably about 0.01 to 0.5 parts by weight per 100 parts by weight of the olefin polymer.

If desired, the method of the invention may utilize thermal stabilizers, weathering stabilizers, surfactants, lubricants, nucleating agents, and anti-blocking agents as long as the benefits of the invention are not lost.

Examples of the thermal stabilizer used herein include phenolic stabilizers and organic phosphorus stabilizers.

Exemplary of the phenolic stabilizers are 2,6-di-t-butyl-4-methylphenol, 2,6-di-t-butyl-4-ethylphenol, 2,6-dicyclohexyl-4-methylphenol, 2,6-diisopropyl-4-ethylphenol, 2,6-di-t-amyl-4-methylphenol, 2,6-di-t-octyl-4-n-propylphenol, 2,6-dicyclohexyl-4-n-octylphenol, 2-isopropyl-4-methyl-6-t-butylphenol, 2-t-butyl-4-ethyl-6-t-octylphenol, 2-isobutyl-4-ethyl-6-t-hexylphenol, 2-cyclohexyl-4-n-butyl-6-isopropylphenol, dl-α-tocopherol, t-butylhydroquinone, 2,2'-methylenebis(4-methyl-6-t-butylphenol), 4,4'-butylidenebis(3-methyl-6-t-butylphenol), 4,4'-thiobis(3-methyl-6-t-butylphenol), 2,2'-thiobis(4-methyl-6-t butylphenol), 4,4'-methylenebis(2,6-di-t-butylphenol), 2,2'-methylenebis[6-(1-methylcyclohexyl)-p-cresol], 2,2'-ethylidenebis(2,4-di-t-butylphenol), 2,2'-butylidenebis(2-t-butyl-4-methylphenol), 1,1,3-tris(2-methyl-4-hydroxy-5-t-butylphenyl)butane, triethyleneglycol-bis[3-(3-t-butyl-5-methyl-4-hydroxyphenyl)propionate], 1,6-hexanediol-bis[3-(3,5-di-t-butyl-4-hydroxyphenyl)propionate], 2,2-thiodiethylenebis[3-(3,5-di-t-butyl-4-hydroxyphenyl)propionate], N,N'-hexamethylenebis(3,5-di-t-butyl-4-hydroxy-hydrocinnamide), 3,5-di-t-butyl-4-hydroxybenzylphosphonate diethyl ester, 1,3,5-tris(2,6-dimethyl-3-hydroxy-4-t-butylbenzyl)isocyanurate, 1,3,5-tris[(3,5-di-t-butyl-4-hydroxyphenyl)propionyloxyethyl]isocyanurate, tris(4-t-butyl-2,6-dimethyl-3-hydroxybenzyl)isocyanurate, 2,4-bis(n-octylthio)-6-(4-hydroxy-3,5-di-t-butylanilino)-1,3,5-triazine, tetrakis[methylene-3-(3,5-di-t-butyl-4-hydroxyphenyl)propionate]methane, bis(3,5-di-t-butyl-4-hydroxybenzyl ethyl phosphonate) calcium, bis(3,5-di-t-butyl-4-hydroxybenzyl ethyl phosphonate) nickel, bis[3,3-bis(3-t-4-hydroxyphenyl)butyric acid]glycol ester, N,N'-bis[(3,5-di-t-butyl-4-hydroxyphenyl)propionyl]hydrazine, 2,2'-oxamido-bis[ethyl-3-(3,5-di-t-butyl-4-hydroxyphenyl)propionate], 2,2'-methylenebis(4-methyl-6-t-butylphenol)terephthalate, 1,3,5-trimethyl-2,4,6-tris(3,5-di-t-butyl-4-hydroxybenzyl)benzene, 3,9-bis[1,1-dimethyl-2-{(3-t-butyl-4-hydroxy-5-methylphenyl) propionyloxy}ethyl]-2,4,8,10-tetraoxaspiro[5,5]-undecane, 2,2-bis[4-(2-(3,5-di-t-butyl-4-hydroxyhydrocinnamoyloxy))ethoxyphenyl]propane, and β-(3,5-di-t-butyl-4-hydroxyphenyl)propionic acid alkyl esters. Preferred among these are 2,6-di-t-butyl-4-methylphenol, tetrakis[methylene-3-(3,5-di-t-butyl-4-hydroxyphenyl)-propionate]methane, and n-octadecyl-β-(3,5-di-t-butyl-4-hydroxypheny propionate belonging to the β-(3,5-di-t-butyl-4-hydroxyphenyl)propionic acid alkyl esters.

Exemplary of the organic phosphorus stabilizers are trioctyl phosphite, trilauryl phosphite, tridecyl phosphite, octyl diphenyl phosphite, tris(2,4-di-t-butylphenyl) phosphite, triphenyl phosphite, tris(butoxyethyl) phosphite, tris(nonylphenyl) phosphite, distearyl pentaerythritol diphosphite, tetra(trisdecyl)-1,1,3-tris(2-methyl-5-t-butyl-4-hydroxyphenyl)butane diphosphite, tetra(C₁₂₋₁₅ mixed alkyl)-4,4'-isopropylidene diphenyl diphosphite, tetra(tridecyl)-4,4'-butylidenebis(3-methyl-6-t-butylphenol)diphosphite, tris(3,5-di-t-butyl-4-hydroxyphenyl) phosphite, tris(mono-, di- mixed nonylphenyl) phosphite, hydrogenated 4,4'-isopropylidenediphenol polyphosphite, bis(octylphenyl).bis[4,4'-butylidenebis(3-methyl-6-t-butylphenyl)].1,6-hexanediol diphosphite, phenyl 4,4'-isopropylidenediphenol pentaerythritol diphosphite, tris[4,4'-isopropylidenebis(2-t-butylphenyl)]phosphite, phenyl diisodecyl phosphite, di(nonylphenyl) pentaerythritol diphosphite, tris(1,3-distearoyloxyisopropyl) phosphite, 4,4'-isopropylidenebis(2-t-butylphenol) di(nonylphenyl) phosphite, 9,10-dihydro-9-oxa-9-oxa-10-phosphaphenanthrene-10-oxide, and bis(dialkylphenyl)pentaerythritol diphosphite esters.

The last-mentioned bis(dialkylphenyl)pentaerythritol diphosphite esters include spiro and cage types of the following formulae (1) and (2), respectively. Most often, mixtures of isomers are used for economical reason because conventional methods produce phosphite esters as an isomeric mixture.

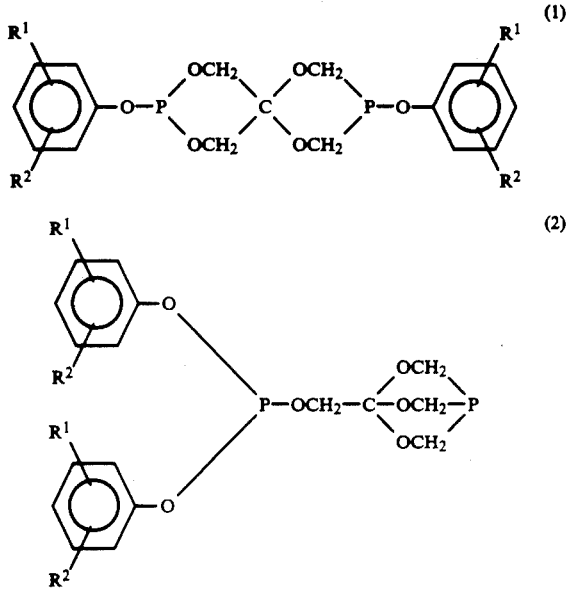

In the formulae, R¹ and R² are selected from alkyl groups having 1 to 9 carbon atoms, preferably branched alkyl groups, and are most preferably tert-butyl groups, and they are most preferably attached to the phenyl group at 2-, 4- and 6-positions.

Illustrative examples of the bis(dialkylphenyl)-pentaerythritol diphosphite esters are bis(2,4-di-t-butylphenyl)pentaerythritol diphosphite and bis(2,6-di-t-butyl-4-methylphenyl)pentaerythritol diphosphite.

Also included in the organic phosphorus stabilizers are phosphonites having a structure in which carbon is directly attached to phosphorus, for example, tetrakis(2,4-di-t-butylphenyl)-4,4'-biphenylene diphosphonite.

Preferred among the above-mentioned organic phosphorus stabilizers are bis(2,6-di-t-butyl-4-methylphenyl)-pentaerythritol diphosphite and tetrakis(2,4-di-t-butylphenyl)-4,4'-biphenylene diphosphonite.

In the embodiment of the invention wherein the thermal stabilizer is used, the above-mentioned phenolic and organic phosphorus stabilizers may be used alone or in admixture of two or more.

When used, the amount of the thermal stabilizer is generally about 0.1 to 30 parts by weight, preferably about 0.5 to 10 parts by weight per part by weight of the higher fatty acid and/or hydrochloric acid acceptor.

In the method of the invention, the higher fatty acid and/or hydrochloric acid acceptor and optionally used additives are supplied to the pyrolytic reaction of olefin polymers in any desired manner, for example, by incorporating them in the olefin polymer feed during pelletization thereof; by batchwise or continuously adding them to the olefin polymer feed at the same time or separately when the olefin polymer feed is admitted into the reactor; or by supplying an olefin polymer feed commercially available as a blend previously containing such higher fatty acid and/or hydrochloric acid acceptor and optional additives.

The above mentioned pyrolytic reaction in the pyrolysis reactor yields a reaction mixture which generally contains volatile components resulting from pyrolytic reaction. Often, the volatile components are mainly composed of hydrogen and hydrocarbons having 1 to about 35 carbon atoms although the exact composition varies with a particular type of olefin polymer as the starting feed. Illustratively, the volatile components are mainly composed of hydrocarbons having about 25 to 35 carbon atoms when the starting feed is polyethylene and hydrocarbons having about 8 to 13 carbon atoms when the starting feed is polypropylene. In addition to the hydrocarbons, incidental impurities in the starting feed and oxygenated hydrocarbons resulting from air incidentally admitted during the process are present in minor amounts and if any, they can adversely affect the hue of the end product or pyrolytic wax. It is to be noted that the presence of oxygenated hydrocarbons is ascertained by subjecting all the volatile components to silica gel fractionation and thin film chromatography, and then to infrared absorption analysis whereupon the presence of hydroxyl, carbonyl and carboxyl groups is observed.

Figure 2:
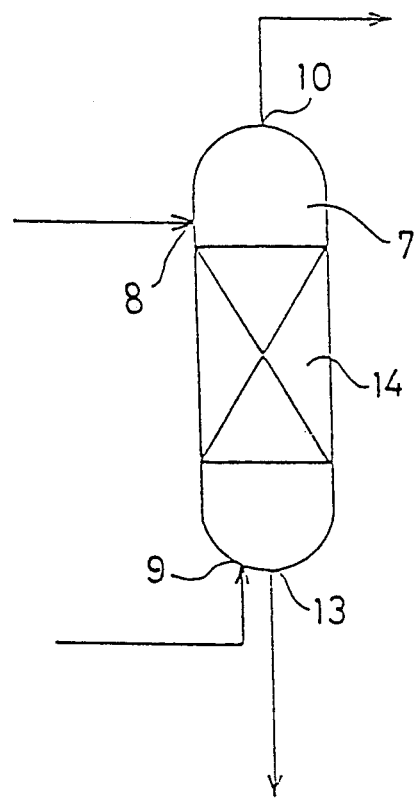
FIG. 2 is a view illustrating a third embodiment of the present invention.

Referring to FIG. 2 showing the third embodiment of the present invention, the third embodiment is described below.

Illustrated in FIG. 2 are an evaporator 7, an inlet 8 for reaction mixture, an inlet 9 for inert gas, an outlet 10 for volatile components, an outlet 13 for reaction mixture, and an insert 14 disposed in the evaporator. A reaction mixture resulting from pyrolytic reaction of an olefin polymer in a pyrolysis reactor (not shown) as previously described is admitted into the evaporator 7 through the inlet 8. The evaporator 7 may be of any desired shape including tower, tube, and tank shapes although a tower shaped evaporator is especially preferred because of promoted contact of the reaction mixture with inert gas, consistent degree of decomposition of the olefin polymer feed, and stable operation.

The evaporator is adjusted to a high temperature of about 250° to 430° C., preferably about 300° to 400° C. because volatile components do not condense or dissolve in the end product or pyrolytic wax, because oxygenated hydrocarbons which would otherwise cause coloring of the wax and be difficult to subsequently separate from the wax do not dissolve in the wax and are thus easy to separate, and because the reaction mixture can be treated at the high temperature as in the pyrolysis reactor with saved energy. The pressure in the evaporator is adjusted to about 500 Torr to 1.8 kg/cm²G, preferably about 750 Torr to 0.5 kg/cm²G. These conditions are advantageous in that any extra equipment such as a vacuum pump and pressure control system is not required and stable operation is facilitated by a simple process.

The volatile components separated from the reaction mixture are withdrawn from the vapor outlet 10 and provided to a condenser (not shown) where they are condensed into a liquid to be discharged as waste oil while the remaining noncondensible gases may be burned in order to prevent the smell from spreading.

In the method of the invention, an inert gas is blown into the evaporator 7 through the gas inlet 9 so as to provide counterflow contact with the reaction mixture for assisting in discharging the volatile components through the vapor outlet 10. The inert gases used herein include nitrogen gas, carbon dioxide gas, steam and the like, with nitrogen gas being preferred. The blowing rate of inert gas may be properly adjusted in accordance with the flow rate of the reaction mixture incoming from the pyrolysis reactor, that is, processing quantity, as well as the type of an olefin polymer used and the degree of pyrolysis although the inert gas is often used in an amount of about 0.1 to 20 mol, preferably about 1 to 5 mol per kg of the reaction mixture.

For the evaporator of tower or tubular type, it is preferably equipped with plates or a static mixer, loaded with packings, or provided with wetted walls, because the contact between the reaction mixture and inert gas is promoted and more effective separation of volatile components from the reaction mixture is achieved.

The plates used herein are not particularly limited and their examples include bubble cap trays, uniflux trays, perforated trays, valve trays (flexible trays, Natta float valve trays, ballast trays, etc.), cascade trays, Venturi trays, Kitter trays, recycling trays, jet trays, turbo grid trays, ripple trays, dual flow trays, baffle trays, and ring and doughnut trays.

Included in the static mixer which is not particularly limited are KENICS type, SULZER type, SQUARE mixer, and T.K. ROSS LPD mixer.

The packings are generally formed of porcelain or metallic materials capable of withstand high temperatures prevailing in the evaporator. Since the shape is not particularly limited, exemplary packings include spherical packings, ring type packings (Raschig rings, Lessing rings, spiral rings, cross partition rings, and pole rings), saddle type packings (bevel saddles and interlocking saddles), spray packings, Pana packings, Goodloe packings, Stedman packings, Dickson packings, MacMahon packings, cannon protruded metal packings, helix, tellerette, and perpendicular plate packings.

The wetted wall may be obtained by utilizing the inner wall of the tower itself or providing a multi-tube structure. Utilization of the tower itself offers the most simple tubular structure because no insert is present in the evaporator interior.

While a variety of inserts are mentioned above, the method of the invention favors the use of perforated trays, jet trays, ripple trays, dual flow trays, baffle trays, and ring-and-doughnut trays among the plates, the above-mentioned ones among the static mixers, spherical packings, ring packings and saddle packings among the packings, and the above-mentioned two structures among the wetted walls because they are applicable to reaction mixtures which are highly viscous and can contain contaminants and because of simple structure.

Preferably, the quantity of inserts disposed in the evaporator corresponds to about 2 or 3 theoretical stages in view of the size of evaporator and separation capacity.

The reaction mixture exiting from the outlet 13 after removal of volatile components in the evaporator is provided to later stage steps where decomposition reaction is terminated by cooling and contaminants are removed by filtration. Finally the reaction mixture is cooled and solidified into a solid pyrolytic wax.

EXAMPLE

Examples of the present invention are given below by way of illustration.

EXAMPLES 1 AND 2

A polymer was pyrolytically decomposed in a system constructed as shown in FIG. 1 by using polypropylene having an ultimate viscosity [$\eta$] of 1.6 dl/g as measured in decalin at 135° C. as the polymer feed and operating an extruder and a tubular pyrolysis reactor of the following specifications under the following conditions.

Extruder

Screw diameter: 39.85 mm
Cylinder diameter: 40.0 mm
Extruder temperature (at outlet): 300° C.
Extrusion rate: 10.5 kg/hr.

Tubular pyrolysis reactor

Reactor tube diameter: 50 mm
Heating temperature: 360° C. and 402° C.
Internal pressure: atmospheric
Residence time: 33 min. (based on polymer feed rate)
Metering means (gear pump, 20 cc/revolution, gear revolution: 13 rpm)
Feed rate: 10.5 kg/hr.

The resulting reaction mixture was subjected to gas-liquid separation for removing volatile components, then filtered and purified, obtaining low molecular weight polymers. The low molecular weight polymers were evaluated or measured for melt viscosity, volatile content, powder hue, melt color, molecular weight distribution (Mw/Mn), and number of terminal double bonds by the following methods. The results are shown in Table 1.

a) Melt viscosity

A low molecular weight polymer sample was heated and melted at 180° C. and the melt viscosity was measured by means of a Brookfield viscometer.

b) Volatile content

A low molecular weight polymer sample, about 2 grams, was kept for 2 hours in a constant temperature hot air dryer at 150° C. and a loss of weight was considered as the volatile content.

c) Powder hue

A sample was ground into a powder having a mean particle size of about 300 μm which was measured for hue by means of a Hunter Laboratory color difference meter.

d) Melt color

A sample was melted at 180° C. and the color of the molten sample was compared with a HAZEN colorimetric standard solution using color comparison tubes.

e) Molecular weight distribution

Measurement was made by Gel Permeation Chromatography (GPC).

f) Number of terminal double bonds

An infrared absorption spectrum was measured whereby the number of terminal double bonds was determined from the characteristic absorption peak of double bond at 1640 cm$^{-1}$.

TABLE 1

| Example | Heating temp., °C. | Melt viscosity, cp at 180° C. | Volatile content, % | Powder hue L | a | b | Melt color, APHA | Molecular weight distribution (Mw/Mn) | Number of terminal double bonds, /1000C |
| --- | --- | --- | --- | --- | --- | --- | --- | --- | --- |
| 1 | 360 | 2200 | <0.01 | 94.0 | 0.2 | 1.5 | 50 | 2.7 | 0.5 |
| 2 | 402 | 45 | 0.15 | 93.8 | 0.0 | 2.2 | 75 | 2.5 | 2.6 |

EXAMPLES 3–5 & COMPARATIVE EXAMPLE 1

Preparation of pyrolytic wax was continued for 9 days by means of a system shown in FIG. 1 by admitting a polymer feed consisting of 100 parts by weight of polypropylene having an ultimate viscosity [$\eta$]of 1.6 dl/g and an amount of the additive(s) shown in Table 2 to the extruder 1 through the inlet 11 and continuously delivering the feed to the tubular pyrolysis reactor 2 equipped with the heater 3 through the flowpath 6 under the following conditions. In Comparative Example 1, the operation was stopped on the second day.

Extruder

Screw diameter: 39.85 mm
Cylinder diameter: 40.0 mm
Extruder temperature (at outlet): 300° C.
Extrusion rate: 10.5 kg/hr.

Tubular pyrolysis reactor

Reactor tube diameter: 50 mm
Heating temperature: 402° C.
Internal pressure: atmospheric
Residence time: 33 min. (based on polymer feed rate)

The continuously outflowing reaction mixture was subjected to gas-liquid separation for removing volatile components, obtaining pyrolytic wax. Samples were taken out everyday over the process.

The pyrolytic wax sample obtained everyday was measured for hue as in Example 1 and measured for contaminant content by the following method. The results are shown in Table 2.

Content of contaminants

It was indirectly judged from the L value associated with the colorimetric measurement of the powder. Larger the contaminant content, the lower became the degree of whiteness and hence, the L value.

EXAMPLE 6

Using a series of an extruder and a tubular pyrolysis reactor, polypropylene having an ultimate viscosity of [$\eta$]of 1.6 dl/g was pyrolytically decomposed under the following conditions.

Extruder

Screw diameter: 39.85 mm
Cylinder diameter: 40.0 mm
Extruder temperature (at outlet): 300° C.
Extrusion rate: 10.5 kg/hr.

Tubular pyrolysis reactor

Reactor tube diameter: 50 mm
Heating temperature: 402° C.
Internal pressure: atmospheric
Residence time: 33 min. (based on polymer feed rate)

The resulting reaction mixture (pyrolysis reactor outlet temperature: 400° C.) was admitted into the evaporator connected to the tubular pyrolysis reactor as outlined in FIG. 2 through the inlet 8 schematically illustrated therein.

Evaporator

Size: tubular, inner diameter 2 inches, length 1 mm
Insert: KENICS type static mixer
Temperature: 380° C.

At the same time, nitrogen gas was blown into the evaporator 7 through the gas inlet 9 at a flow rate of 350 N-liter/hr. for evaporation. Volatile components separated from the reaction mixture were continuously withdrawn through the vapor outlet 10 and cooled in a subsequent step (not shown). In turn, the reaction mixture from which volatile components had been separated was withdrawn through the outlet 13, rapidly cooled to 200° C. for completely terminating pyrolytic

TABLE 2

| Example | Additive | | | 1 | 2 | 3 | 4 | 5 | 6 | 7 | 8 | 9 |
| --- | --- | --- | --- | --- | --- | --- | --- | --- | --- | --- | --- | --- |
| 3 | A = 0.05*[1] | powder hue | L | 94.0 | 94.9 | 93.5 | 93.5 | 93.5 | 93.5 | 94.0 | 93.5 | 93.0 |
| | | | a | 0.2 | 0.1 | 0.2 | 0.3 | 0.1 | 0.2 | 0.2 | 0.1 | 0.1 |
| | | | b | 2.0 | 2.1 | 2.4 | 2.2 | 2.5 | 2.4 | 2.1 | 2.2 | 2.3 |
| | | melt hue (APHA) | | 100 | 100 | 100 | 100 | 100 | 100 | 100 | 100 | 100 |
| 4 | B/A = 0.05/0.05*[2] | powder hue | L | 94.0 | 94.0 | 94.0 | 94.0 | 93.5 | 93.5 | 94.0 | 93.5 | 93.5 |
| | | | a | 0.2 | 0.2 | 0.1 | 0.1 | 0.2 | 0.1 | 0.1 | 0.1 | 0.1 |
| | | | b | 1.8 | 2.0 | 2.0 | 1.8 | 2.2 | 2.1 | 2.0 | 2.2 | 2.2 |
| | | melt hue | | 100 | 100 | 100 | 100 | 100 | 100 | 100 | 100 | 100 |
| 5 | C/A = 0.05/0.05*[3] | powder hue | L | 94.0 | 93.5 | 93.5 | 94.0 | 93.5 | 93.5 | 93.0 | 93.0 | 93.5 |
| | | | a | 0.2 | 0.3 | 0.3 | 0.3 | 0.3 | 0.3 | 0.4 | 0.3 | 0.3 |
| | | | b | 2.2 | 2.5 | 2.8 | 3.0 | 3.1 | 2.9 | 3.2 | 3.1 | 3.1 |
| | | melt hue | | 100 | 100 | 125 | 125 | 125 | 125 | 125 | 125 | 125 |
| Comparative Example 1 | non | powder hue | L | 85.0 | discontinuance | | | | | | | |
| | | | a | −0.1 | | | | | | | | |
| | | | b | 4.0 | | | | | | | | |
| | | melt hue | | 250 | | | | | | | | |

*[1]A: calcium stearate
*[2]B: n-octadecyl β-(3,5-di-t-butyl-4-hydroxyphenyl)-propionate
*[3]C: tetrakis[methylene-3-(3,5-di-t-butyl-4-hydroxyphenyl)-propinate]methane reaction, filtered, and then cooled and solidified into a pyrolytic wax.

The pyrolytic wax was measured for melt viscosity, volatile content, powder hue, melt color, and ratio (Mw/Mn) of weight average molecular weight (Mw) to number average molecular weight (Mn) representative of molecular weight distribution as in Example 1 and further evaluated or measured for flash point and smell by the following methods. The results are shown in Table 3.

Flash point

Measurement was made with a Pensky-Martens flash point tester (closed type).

Smell

An organoleptic test used persons having a normal sense of smell.

Comparative Example 2

Pyrolytic wax was obtained by the same procedure as in Example 6 except that the reaction mixture exiting from the tubular pyrolysis reactor was not admitted into the evaporator and instead, volatile components were separated by cooling to 200° C.

The pyrolytic wax was measured or evaluated for melt viscosity, volatile content, flash point, powder hue, melt color, ratio (Mw/Mn) of weight average molecular weight (Mw) to number average molecular weight (Mn) representative of molecular weight distribution, and smell as in Example 1 or 6. The results are shown in Table 3.

Comparative Example 3

Pyrolytic wax was obtained by the same procedure as in Example 6 except that no nitrogen gas was blown into the evaporator.

The pyrolytic wax was measured or evaluated for melt viscosity, volatile content, flash point, powder hue, melt color, ratio (Mw/Mn) of weight average molecular weight (Mw) to number average molecular weight (Mn) representative of molecular weight distribution, and smell as in Example 1 or 6. The results are shown in Table 3.

Comparative Example 4

Pyrolytic wax was obtained by the same procedure as in Example 6 except that no insert was disposed in the evaporator.

The pyrolytic wax was measured or evaluated for melt viscosity, volatile content, flash point, powder hue, melt color, ratio (Mw/Mn) of weight average molecular weight (Mw) to number average molecular weight (Mn) representative of molecular weight distribution, and smell as in Example 1 or 6. The results are shown in Table 3.

INDUSTRIAL APPLICABILITY

The present invention provides a method capable of continuously producing low molecular weight polymers of quality by pyrolytically decomposing a polymer with a simplified apparatus in a simple step. The invention is of great industrial value in practice because the polymer to which the invention is applicable is not particularly limited and a variety of polymers can be pyrolytically decomposed into low molecular weight polymers of quality.

The method of the invention is also of great industrial value in practice when pyrolytic reaction is carried out in the presence of a higher fatty acid and/or a hydrochloric acid acceptor because there is obtained a pyrolytic wax which is improved in quality with respect to hue and contaminant content and preparation of such pyrolytic wax of quality can be continued for a long period in a stable manner.

Further the third embodiment of the method of the invention allows volatile components to be immediately and effectively removed from the reaction mixture resulting from pyrolysis of an olefin polymer, thus producing a pyrolytic wax which is improved in quality with respect volatile content, powder and melt hue, smell, flash point, molecular weight distribution and the like. Since oxygenated hydrocarbons which would largely detract from the hue of the end product or pyrolytic wax among the volatile components, are prevented from mixing with or dissolving in the end pyrolytic wax, there is obtained a pyrolytic wax having a minimal content of oxygenated hydrocarbons and good hue.

According to the method of the invention, any desired pyrolytic wax can be obtained depending on the heating temperature in a tubular pyrolysis reactor, an olefin polymer used and the like, and the pyrolytic wax is a homogeneous one having a narrow molecular weight distribution and improved in quality with respect to volatile content, hue, heat resistance, flash point, smell, and thermal stability. Consequently, the pyrolytic wax obtained by the method of the invention finds a wide variety of applications including usages as pigment dispersants requiring color (chromatic color) clearness, copying machine toners requiring image visibility and release property, resin modifiers for food and medical agents requiring odorless and hygienic features, hot-melt adhesives requiring heat resistance and thermal stability, heat resistant ink, and the like.

TABLE 3

| Example | Melt viscosity, cp at 180° C. | Volatile content, % | Flash point °C. | Powder hue L | a | b | Melt color, APHA | Molecular weight distribution (Mw/Mn) | Smell |
|---|---|---|---|---|---|---|---|---|---|
| 6 | 45 | 0.15 | 220 | 93.8 | 0.0 | 2.2 | 75 | 2.5 | none |
| CE2 | 30 | 6.0 | <140 | 91.5 | −0.1 | 5.0 | 200 | 3.8 | strong |
| CE3 | 40 | 2.0 | 150 | 92.5 | −0.1 | 4.0 | 150 | 2.9 | weak |
| CE4 | 44 | 0.30 | 210 | 93.5 | 0.0 | 2.6 | 100 | 2.6 | none |

We claim:

1. A method for the pyrolysis of an olefin polymer for producing a pyrolytic wax comprising the steps of:

feeding an olefin to an extruder where the polymer is melted, metering the molten polymer from the extruder to a tubular pyrolysis reactor through a gear pump connected to the extruder;

pyrolytically decomposing the polymer in the tubular pyrolysis reactor in the presence of a higher fatty acid, a hydrochloric acid acceptor or a mixture thereof, to produce low molecular weight polymers;

introducing the low molecular weight polymers from the tubular pyrolysis reactor into an evaporator while adjusting the temperature in the evaporator to about 250° to 430° C., and causing evaporation of the volatile components in the evaporator while blowing an inert gas into the evaporator with the low molecular weight polymers; and withdrawing volatile components separated from the low molecular weight polymers from the evaporator.

2. The method of claim 1 which comprises blowing the inert gas into the evaporator in counterflow contact with the low molecular weight polymers.

3. The method of claim 1 which further comprises providing insert means within the evaporator for promoting contact between the low molecular weight polymers and the inert gas.

4. The method of claim 1 which comprises adjusting pressure in the evaporator to from about 500 Torr to 1.8 $Kg/cm^2G$.

5. The method of claim 1 which comprises adjusting the temperature and pressure in the evaporator to from about 300° C. to 400° C., and from about 750 Torr to 0.5 $Kg/cm^2G$, respectively.

6. The method of claim 5 wherein the olefin polymer comprises polyethylene or polypropylene.

7. The method of claim 1 wherein the olefin polymer comprises polyethylene or polypropylene.

8. The method of claim 4 wherein the olefin polymer comprises polyethylene or polypropylene.

9. The method of claim 2 wherein the olefin polymer comprises polyethylene or polypropylene.

* * * * *